Jan. 20, 1959  N. L. COOK  2,869,278
FISHHOOK RELEASE
Filed May 28, 1957
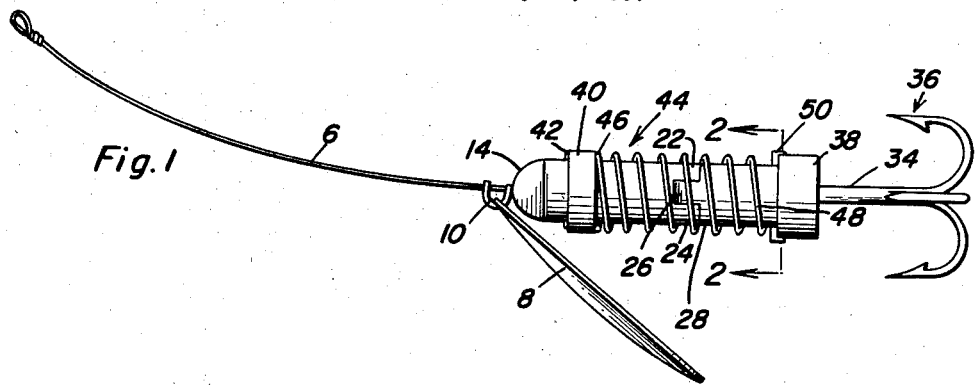
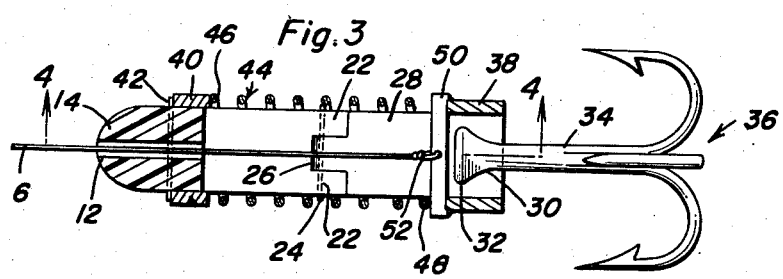
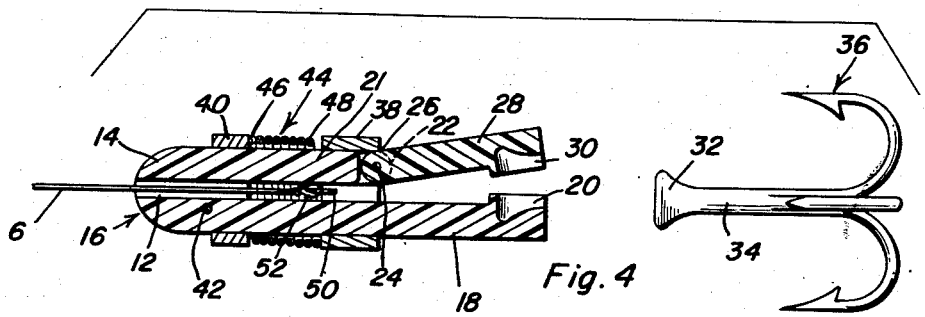
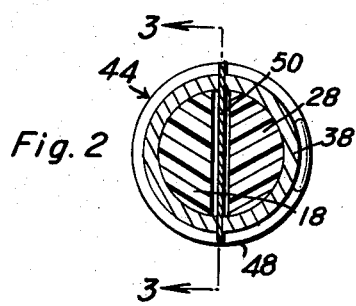
Nolan L. Cook
INVENTOR.

United States Patent Office 2,869,278
Patented Jan. 20, 1959

2,869,278

FISHHOOK RELEASE

Nolan L. Cook, Lathrop, Calif.

Application May 28, 1957, Serial No. 662,089

3 Claims. (Cl. 43—42.08)

The present invention relates to fishing tackle, generally speaking, and has more particular reference to a fishing line which is provided at its fishing end with a device of novel construction for releasably connecting either a sinker or a fishhook thereto and does so in such a way that, if the fishhook snags on a log, rock or other obstruction it may be automatically detached when a predetermined pull on the line is exerted.

Stated otherwise the invention pertains to a connecting device carried by the fishing line and which serves to releasably connect the shank of a fishhook to the line, said device being in fact a coupling with which the shank of the hook has releasable connection.

In carrying out a preferred embodiment of the invention the connecting device which is utilized comprises a longitudinally bored body. An end portion of the line is slidable through the bore in the body and is operatively connected to a collar which is slidable on the body toward and from a second collar also carried by the body and which is resisted by a coil spring which is normally expanded and surrounds the body between the collars. That end of the body which is adapted to accommodate the shank of the fishhook is provided with a pair of cooperating jaws, one stationary and the other movable and said jaws are maintained normally closed by the encircling spring biased collar.

Other objects, features and advantages will become more readily apparent from the following description and the accompanying drawing.

In the drawing:

Fig. 1 is a side elevation showing the fishing line rigged for use and including the improved connecting device and releasably mounted fishhook carried by said device.

Fig. 2 is a cross section on an enlarged scale on the line 2—2 of Fig. 1.

Fig. 3 is a section on the line 3—3 of Fig. 2.

Fig. 4 is a longitudinal section on the line 4—4 of Fig. 3 showing the movable jaw open and the manner in which the releasable fishhook cooperates therewith.

The fishing line leader is denoted by the numeral 6 and is provided with a spoon or the like 8 connected by a clevis 10 thereto. An end portion of the leader or line passes through an axial bore 12 in the body portion 14 of the improved release-type connector 16. The trailing end portion of the body is essentially semi-circular in form at 18 and the terminal end portion is recessed at 20 to define a relatively stationary jaw. The end portion 21 is bifurcated and the furcations are denoted at 22. The furcations serve to accommodate a pivoting or hinging pin 24 which passes therethrough and also through a hinging lug 26 on the cooperating end portion of a relatively movable jaw 28. The surface of the jaw 28 which is opposed to the corresponding portion of the jaw 18 also has a recess 30 and the two recesses 30 and 28 cooperate in defining a receiving and retaining socket for the headed end portion 32 on the shank 34 of a multiple pronged fishing hook 36. The expression "fishing hook" is used here to identify a hook as such or to also comprehend a sinker (not shown) that is a sinker which has a head which would correspond to the head 32.

In order to keep the jaws closed and the head 32 gripped in the socket means therebetween jaw retaining means is provided. As before intimated this comprises a first relatively slidable collar 38 which is shiftable toward and from a relatively stationary collar 40 which embraces the median part of the body portion and which normally bears against a stop pin 42. A coil spring 44 encircles the body portion and the forward or leading coil 46 bears against the relatively stationary collar 40 and the other or trailing end coil 48 bears against the collar 38 and normally keeps it in the extended position seen in Fig. 1. When in this position it will be evident that the spring pressed or biased collar 38 keeps the jaw 28 closed against the jaw 18 and consequently the headed shank of the fishhook 36 is releasably and swivelly mounted in the socket (recesses 20 and 30 combined). It will be also noticed that there is an anchor or cross member 50 provided and this is fixed across the collar 38 and is movable with the collar and an adjacent end of the leader is tied or otherwise connected thereto as at 52. This cross piece operates back and forth in the slot provided between the jaws 18 and 28. In fact the slot extends well beyond the hinged point of the jaw 28 as brought out in Fig. 4 making it possible to collapse or compress the coil spring to the extent that the jaw retaining collar 38 moves beyond the hinge point 24 whereupon the jaw 28 is now free to open. When the jaw is open the fishhook is automatically released. Therefore, in case the fishhook becomes snagged in a log or the like while fishing if the user of the device exerts the necessary pull on the fishing line the line exerts, in turn, a pull on the collar 38 by way of the anchor 50. This results in compressing the spring and allowing the jaws to open and the fishhook to be released.

Figs. 1 and 3 show the fishhook joined with the coupling or connecting means 16 and the latter connected with the fishing line. Fig. 4 shows the action of the spring when compressed and the position of the releasing collar 38 which allows the jaws to part and the fishhook to be released.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a fishing line, a fishhook having a shank with a hook at one end and enlarged attaching and retaining head at one end, and means for separably coupling the headed end of said shank to the fishing line comprising a rigid elongated body having a bore extending axially therethrough, a portion of said line extending slidably through said bore, the trailing end portion of said body having a fixed jaw on one side and a pivoted relatively movable jaw opposed thereto and on a diametrically opposite side, said jaws having grips releasably engageable with the head on said shank, a slidably movable collar normally embracing said jaws and adapted to close said jaws, a second collar carried by said body, a coil spring embracing the body and bearing at its ends against said collars, the opposed surfaces of said jaws being provided with duplicate recesses conjointly providing a socket, said socket being adapted to releasably accommodate the head on said shank, said movable collar having a cross member fixed thereon providing an anchor, and said line being attached to said anchor.

2. In combination, a fishing line, a fishhook having a shank with a hook at one end, an enlarged attaching and retaining head at the other end, and means for separably coupling the headed end of said shank to the fishing line comprising a rigid elongated body having a bore extending axially through the body, a portion of said line extending slidably through said bore, the trailing end portion of said body having an extending portion provided with a recess and providing a stationary jaw, said trailing end portion being bifurcated and defining furcations, a second recessed jaw opposed to said stationary jaw and having one end pivoted to said furcations and providing a hinged joint, an abutment operatively mounted on a median portion of said body and located on one side of the hinged joint, a collar spaced longitudinally from said abutment and slidingly embracing the recessed portions of said jaws and located to the other side of said hinged joint, said collar being provided with a fixed line anchor, said fishing line extending through said bore and having its trailing end fastened to said anchor, and a coil spring encircling the jaws and body as well as said hinged joint and interposed between and cooperatively engaging said abutment and collar.

3. For use in conjunction with a fishing line and a fishhook which has a shank with a hook at one end and an enlarged attaching and retaining head at the other end; means for separably coupling the headed end of the shank to said fishing line comprising a rigid body having a bore extending through the body, a portion of the fishing line being adapted to extend slidably through the bore, the trailing end portion of said body having a stationary jaw located to one side of the body and a companion jaw pivotally mounted on a diametrically opposite side of the body and movable toward and from the stationary jaw, said jaws having opposed surfaces designed to be releasably engaged with the head on said shank, a slidably movable collar normally embracing said jaws, a coil spring mounted operatively on the body and having one end cooperable and resisting the movement of said collar, said opposed jaw surfaces being provided with duplicate recesses cooperating with each other in providing a socket which is adapted to releasably accommodate the head on the shank, said collar having a cross member fixed thereon and bridging an adjacent portion of said bore and said cross member being adapted to permit an end portion of the fishing line to be attached thereto so that when the fishing line is stressed the collar is slid against the tension of the spring to a position beyond the hinge joint, whereby to allow the movable jaw to open and release said head.

References Cited in the file of this patent

UNITED STATES PATENTS

| | | |
|---|---|---|
| 1,457,550 | Runkel | June 5, 1923 |
| 2,435,730 | Worden | Feb. 10, 1948 |

FOREIGN PATENTS

| | | |
|---|---|---|
| 687,010 | Great Britain | Feb. 4, 1953 |